April 19, 1966  P. CHEMIN  3,247,071
LOADING-UNLOADING MACHINE FOR NUCLEAR REACTOR
Filed Dec. 3, 1963  5 Sheets-Sheet 1
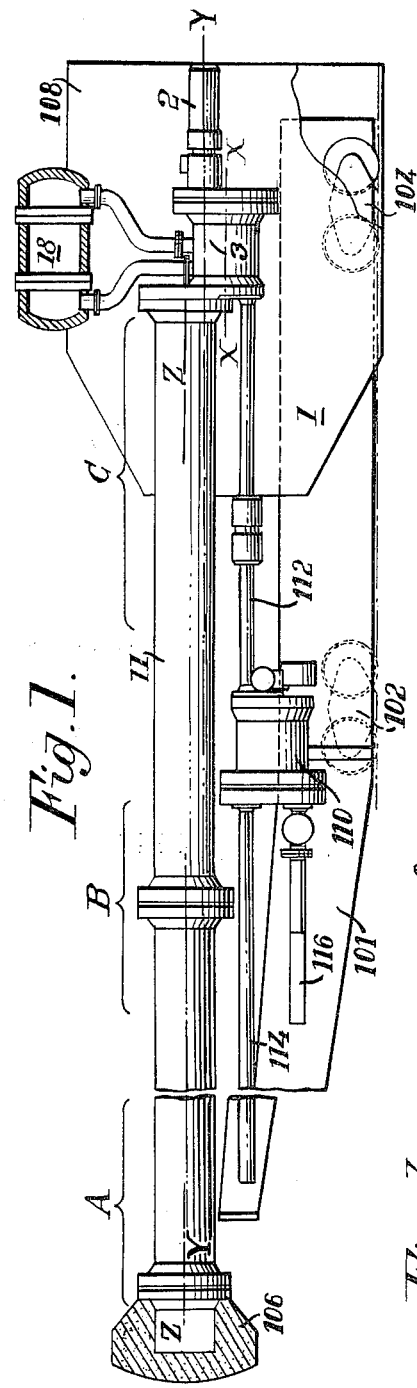
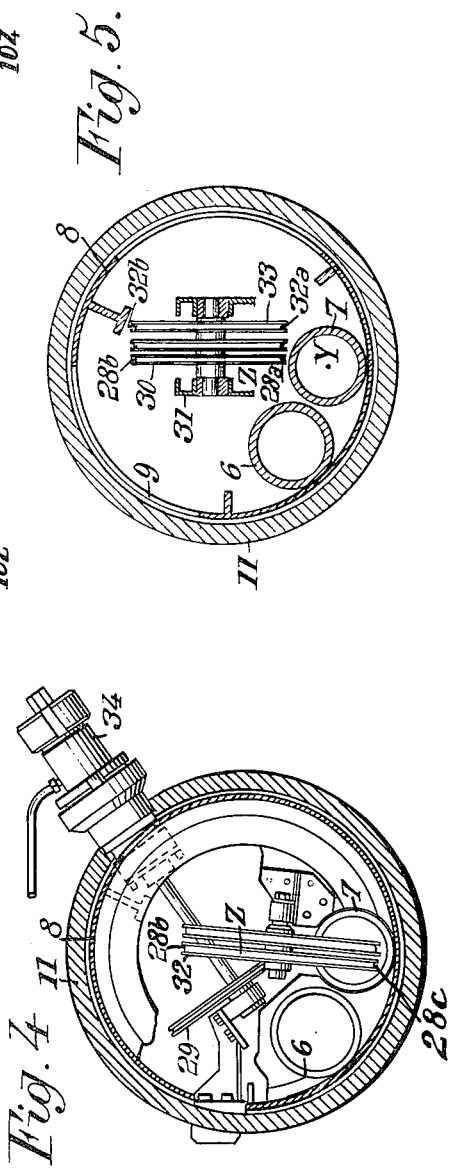

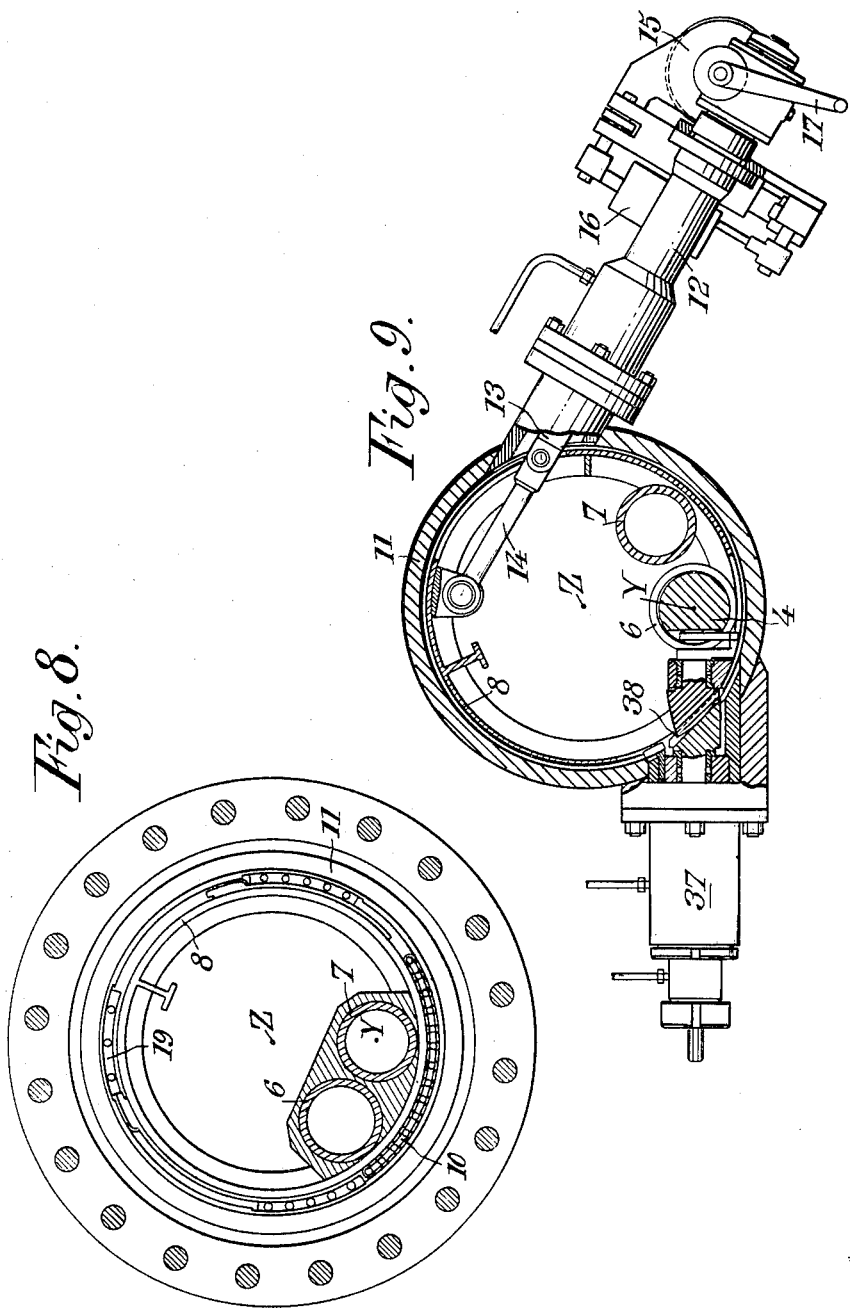

United States Patent Office 3,247,071
Patented Apr. 19, 1966

3,247,071
LOADING-UNLOADING MACHINE FOR
NUCLEAR REACTORS
Paul Chemin, Paris, France, assignor to Commissariat
a l'Energie Atomique, Paris, France
Filed Dec. 3, 1963, Ser. No. 327,782
Claims priority, application France, Dec. 13, 1962,
918,575
11 Claims. (Cl. 176—30)

This invention relates to machines for loading and unloading nuclear reactors of the type having a core of moderator material formed with parallel channels adapted to receive nuclear fuel elements therein. The channels are generally arranged to have a cooling and/or heat-transfer gas circulated through them and so are under pressure. The fuel elements are generally in the form of elongated cylinders sometimes termed cartridges. The channels are sealed at their ends, after insertion of the fuel elements into them, by means of end plugs which are of considerable length.

Loading and unloading machines of the kind to which the invention relates are arranged to be advanced into alignment with a selected fuel channel of the reactor core and to establish a pressure-tight connection between a sleeve member provided at the forward end of the pressure-tight shell of the machine and the channel. The machine is provided with a manipulator arm longitudinally movable in its pressure-sealed shell, and a revolving magazine or barrel is positioned between said arm and the sleeve and has a plurality of parallel sockets and trough-passages therein which are selectively positionable by indexed rotation of the magazine in order to establish a through communication between the shell of the machine and the fuel channel. The machine is then operated to engage the channel end-plug by means of a grab at the outer end of the manipulator arm, extract the plug, then withdraw spent fuel elements from the channel, insert fresh fuel elements (and possibly one or more of the incompletely exhausted fuel elements), and then replace the end plug and disconnect the sleeve from the fuel channel. The revolver magazine is appropriately indexed during the process to insert fresh fuel elements from a loading station and for temporarily storing irradiated cartridges withdrawn from the channel pending discharge from the machine.

Conventional machines of this kind must have extremely large longitudinal dimensions since the manipulator arm may have to reach to the far end of a fuel channel to insert or remove the fuel elements therein. Further, the arm must be capable of retracting the end plug of a channel into it, and such plugs are of considerable length, generally several times the length of the fuel cartridges. Because of this twofold requirement, the manipulator arm had to be both very long and displaceable over a very long axial stroke, and this has very greatly increased the size of the machine.

It is an object of this invention to reduce the length of fuel loading-unloading machines while improving their efficiency. Another object is to reduce the weight of the machine through reduction in the necessary radiation shielding that must be associated with it. Further objects include the provision of improved, simple and rugged mechanisms for controlling the various functions of a loading-unloading machine. Other objects will appear.

In an important aspect, the invention comprises a loading-unloading machine for inserting and removing fuel elements and channel end-plugs into and from a fuel channel of a nuclear reactor, comprising a sealed shell, a sleeve at a forward end of the shell sealingly engageable with a fuel channel in axial alignment therewith, a revolving magazine between said shell and said sleeve a tubular frame supported in the shell for rotation about an axis parallel to the axis of the sleeve member and displaced laterally therefrom, a first arm for manipulating said plugs, a second arm for manipulating said fuel elements, means supporting said arms longitudinally within said frame parallel to said axis and at equal radial distances therefrom so as to be selectively alignable with the axis of said sleeve member and fuel channel at a related one of two active angular positions of said frame in said shell, and means for imparting axial displacements to each of said arms when the frame is positioned in the related active position.

It will be easily understood that with the arrangement of the invention the total length of the machine may be greatly reduced over that of a machine of comparable specifications in which a common manipulator arm is used to displace the long end plugs over short distances and the short fuel elements over long distances. Further, the arrangement makes it possible, as will later be shown, to concentrate the radiation-protective shielding at a few selected locations in which it will be most useful and thus to achieve the requisite shielding effect with a lesser weight of concrete.

The various objects, features and advantages of the invention will be clearly understood from the ensuing disclosure of an exemplary embodiment of the invention selected by way of illustration only and with reference to the accompanying drawings where—

FIG. 1 is a general side elevational view of the machine at a smaller scale than the following figures.

FIG. 4 is a cross section on line IV—IV of FIG. 2a;

FIG. 5 is a cross section on line V—V of FIG. 2b;

FIG. 8 is a cross section on line VIII—VIII of FIG. 2b, and FIG. 9 is a cross section on line IX—IX of FIG. 3b.

Figure 2A:
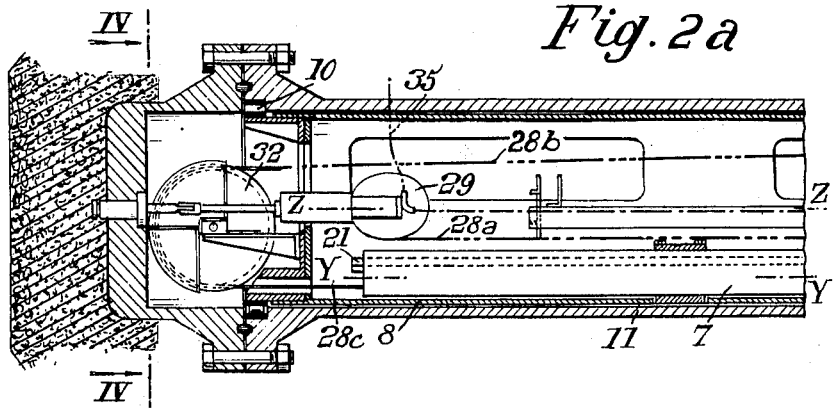
FIGS. 2a, 2b and 2c are longitudinal sectional views of the parts of the machine generally indicated at A, B and C respectively in FIG. 1, with the rotatable frame being rotated to the position in which the fuel element manipulator arm is in alignment with a fuel channel.

As shown in FIG. 1, a fuel handling machine according to the invention generally comprises a frame 1 mounted on rear and front bogeys 102, 104 for longitudinal movement towards and away from an extremity of a selected fuel channel of a reactor core, not shown, which would be situated to the right of the machine in FIG. 1. Means, not shown, are provided for transversely moving the machine frame in order to shift it into register with a particular fuel channel to be processed. The frame 1 supports by way of a cantilever crandle 101 a long tubular casing or shell 11 which as shown may be assembled from two casing sections, and providing a pressure-sealed enclosure. Supported at the rear (or left-hand) extremity of the sealed tubular casing or shell 11 is a protective head of concrete or beam catcher 106. At the forward end of the machine the frame 1 carries a large-sized concrete block 108.

Figure 2B:
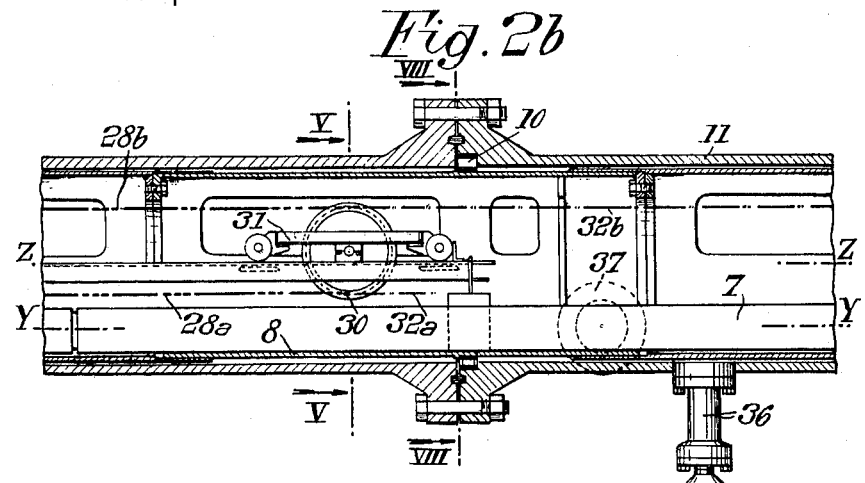
Figure 2C:
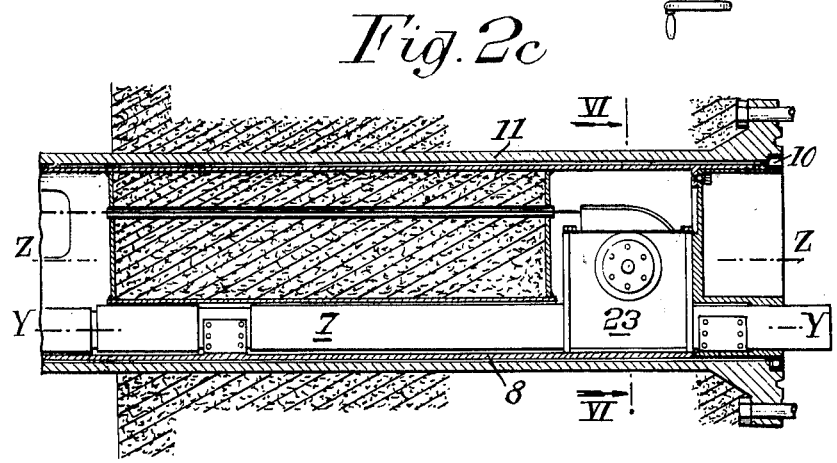

Mounted coaxially within the tubular shell 11 for rotation therein about the axis Z—Z, is a rotary frame 8 (see FIGS. 2a–2c) in the general form a tube which is mounted within the shell 11 by way of longitudinally spaced roller bearings 10 as shown in each of FIGS. 2a, 2b and 2c.

Carried on the frame 1 at its forward end and spaced from the forward end of the shell 11 is a sleeve member 2 which is adapted to be placed in sealing engagement with the extremity of a selected fuel channel of the reactor core. It will be noted that the centre axis Y—Y of the sleeve 2 is parallel to but displaced from the common axis Z—Z of the shell 11 and rotary frame 8. Within the gap between the shell 11 and sleeve 2 is positioned a revolving magazine or barrel 3 rotatable about an axis X—X parallel to both afore-mentioned axes Y—Y and Z—Z. The internal structure of the rotary magazine or barrel 3 is not shown since it may be generally conventional and forms no part of this invention, and it will suffice to understand that the magazine is formed with a plurality of axial sockets for the temporary storage therein of fuel elements, as well as with at least one through passage, whereby a continuous connection can be established from the rotary frame 8 through barrel 3 to sleeve 2 as will later appear. An overhead reservoir 18 containing coolant for the irradiated fuel elements is shown connected to barrel 3. The frame 1 also carries at an intermediate position, a magazine 110 for fresh fuel elements, and connectable with the magazine 3 by way of a conduit 112, for insertion of new fuel elements to be loaded into the fuel channel of the reactor. It will be understood that such fresh fuel elements would be inserted into the fresh fuel magazine 110 by means of a loading device 116, and then transferred from the magazine 110 into the magazine 3 through conduit 112 by means of a transfer manipulator 114. The arrangements just described form no part of this invention and are not believed to require more detailed disclosure.

The rotating tubular frame 8 carries within it a pair of tubular guides 6 and 7 (see FIGS. 4 to 9) positioned close to one another and close to the inner periphery of frame 8, at such a radial distance from the axis Z—Z of frame 8 that rotation of the frame about said axis will be capable of bringing either of the guides 6, 7 into axial alignment with the output axis Y—Y of the sleeve element 2. Preferably the angular distance between the centre axes of the tubular guides 6 and 7 as measured with respect to the main axis Z—Z is relatively small, e.g. less than about 60°, and advantageously about 45° as shown, so that the rotation that has to be imparted to rotary frame 8 in order to pass from that active position in which one of said guides is aligned with output axis Y—Y to the other active position in which the other guide is aligned with said axis, is correspondingly small. This makes it possible to provide the roller bearings 10 over correspondingly limited circumferential arcs, as shown in FIG. 8. That figure also shows abutment means 19 for limiting the rotary displacements of tubular frame 8.

Manipulator arms 4 and 5 are respectively mounted in the tubular guides 6 and 7 for independent axial movement in them. Manipulator arm 4 serves for the manipulation of the long end plugs which seal the end portions of the fuel channels in the reactor core. Manipulator arm 5 serves essentially to manipulate the shorter fuel elements or cartridges placed in said channels beyond the plugs.

Figure 3A:
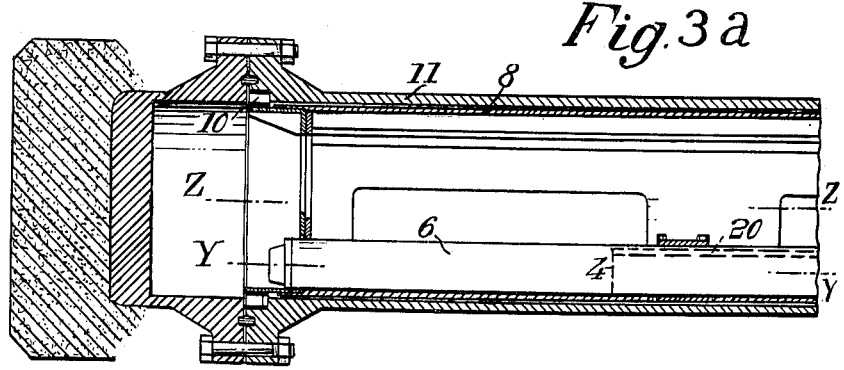
FIGS. 3a, 3b and 3c are views similar to the foregoing but in the position where the plug manipulator arm is in its active or aligned position.

The tubular frame 8 can thus be rotated to either of two operative or active positions. In one position, shown especially in FIGS. 2a to 2c (and also in the sectional views of FIGS. 4, 5, 6 and 8), the tubular guide 7 is aligned with output axis Y—Y for removal or insertion of a fuel element; while in the other position, see especially FIGS. 3a to 3c (and FIGS. 7 and 9), guide 6 is aligned with axis Y—Y for removal or insertion of plug. It will be understood that in addition to the fuel elements and end plugs here referred to, the fuel channel may include various other components such as shields, dummy cartridges, and the like. Any such elements would usually be handled by means of the fuel manipulator arm 5.

Rotation of tubular frame 8 between its two active positions is effected in this embodiment by means of a fluid ram actuator device including a ram cylinder 12 (see especially FIG. 9), supported from the exterior of outer shell 11 transversely thereto, at an intermediate position along the length of the shell. The ram includes a piston rod 13 projecting from the inner end of cylinder 12 through an aperture formed in shell 11, and a link 14 is pivoted to the end of said piston rod. The link 14 extends through a wide aperture formed in the wall of tubular rotary frame 8 and has its free end pivoted to a lug projecting from the inner surface of frame 8. The ram may be controlled through any suitable means, electric, hydraulic, pneumatic, or/and mechanical, and as shown there is provided a mechanical control mechanism 15 associated with a torque limiter 16, and an emergency manual control 17. The details of the control are per se unimportant, and it will be readily understood that in the extended condition of ram piston rod 13 link 14 holds the rotary frame 8 in the position, shown in FIG. 9, in which the plug-manipulator 6 is held in axial alignment with the output axis Y—Y of the machine, whereas in a retracted condition of the ram link 14 will rotate frame 8 clockwise in FIG. 9, to a position (not shown) in which the fuel manipulator guide 7 is aligned with said axis Y—Y.

Figure 6:
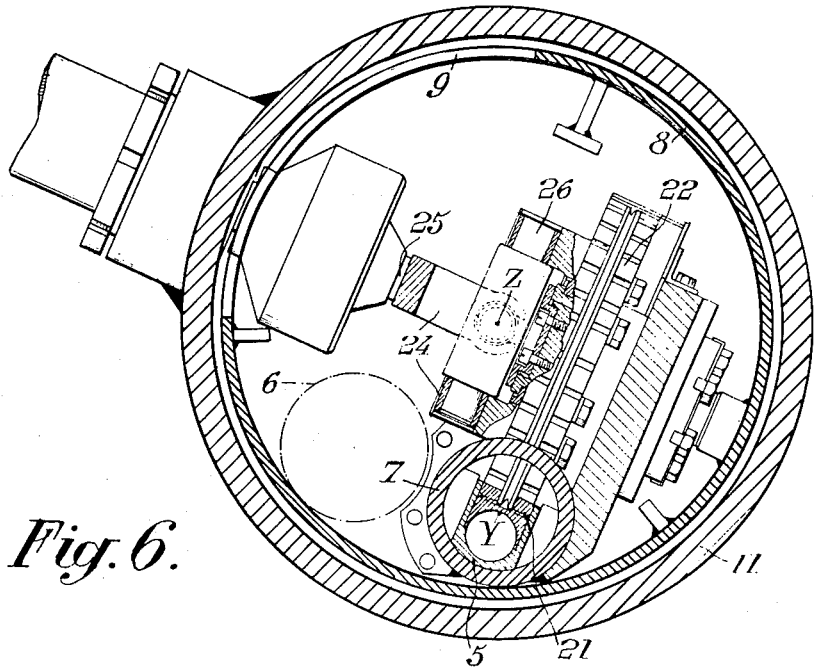
FIG. 6 is a cross section on line VI—VI of FIG. 2c.
Figure 7:
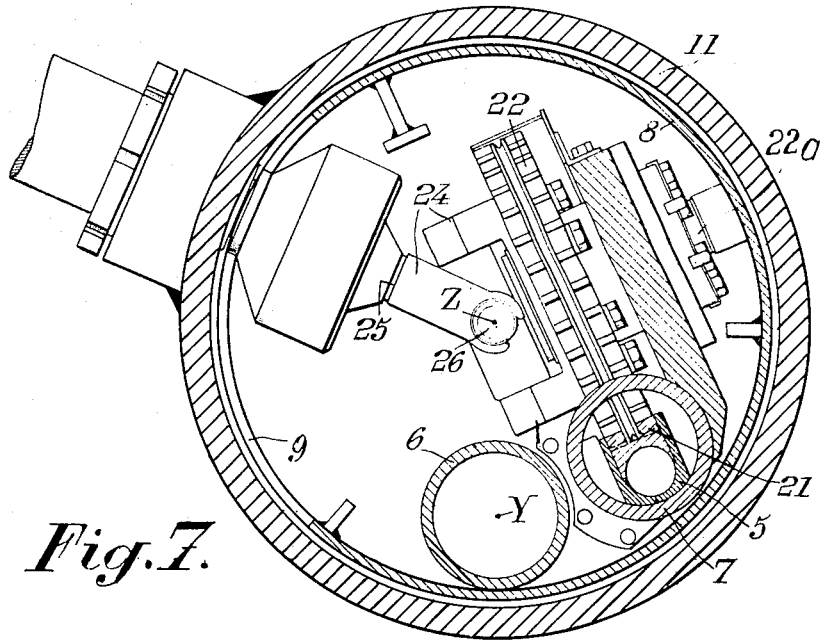
FIG. 7 is a cross section on line VII—VII of FIG. 3c, both these FIGURES 6 and 7 being drawn to a scale larger than the remaining ones.

Axial movement of the manipulator arms 4 and 5 in their respective guides 6 and 7 is effected through rack and gear mechanisms. Thus, plug manipulator arm 4 carries a rack 20 (see FIG. 3a) and fuel manipulator arm 5 carries a rack 21 (see FIGS. 6 and 7). The longitudinal manipulator control mechanisms for both manipulator arms 4 and 5 are similar, and only that pertaining to fuel manipulator 5 will be described in detail. The rack 21 secured to a side of manipulator arm 5 is in mesh with a gear 22 mounted for rotation on a shaft 22a supported from the inner wall surface of rotary frame 8, and extending partly through a slot formed in the tubular guide 7 so as to engage with the rack 21 within it. Rotation of gear 22 is effected from outside shell 11 by means of a mechanism generally designated 23 (in FIG. 2c), and positioned near the extreme front end of the machine frame, such location being necessary because of the very great longitudinal stroke that has to be imparted to the fuel manipulator arm 5 in order to permit insertion and removal of fuel elements throughout the full length of the fuel channels. As shown in FIG. 6 and 7 the mechanism 23 includes essentially a Cardan-joint linkage 24 having its one end member secured to a side of gear 22 and its other end member secured to a control shaft 25 which is journalled in a bearing secured to the outer surface of shell 11 and projects into the rotary frame 8 through a wide aperture 9 in the wall of this frame. The end members 24 of the Cardan joint are interconnected in well-known fashion by way of an intermediate member or spider 26 pivoted to the respective end members 24 on orthogonal axes and having its geometric centre positioned on the axis Z—Z. The arrangement is such that in the active position shown in FIG. 6, in which the frame 8 has been rotated about the axis Z—Z so as to place the fuel manipulator guide 7 into alignment without put axis Y—Y, the axis of gear 22 is substantially aligned with the axis of the control shaft 25, while in the position shown in FIG. 7, wherein the tubular frame 8 is rotated to bring the other, plug-manipulator guide 6 into coincidence with axis Y—Y, so that the axis of gear 22 is at an angle to the axis of shaft 25, the pivot axis connecting spider 26 with the end member 24 secured to shaft 25 lies in coincidence with the axis Z—Z. Such an arrangement of the Cardan joint linkage is highly compact and makes possible a direct and positive drive of gear 22 from control shaft 25 in the active position of frame 8 shown, while permitting the frame to be freely rotated between its two positions.

Figure 3B:
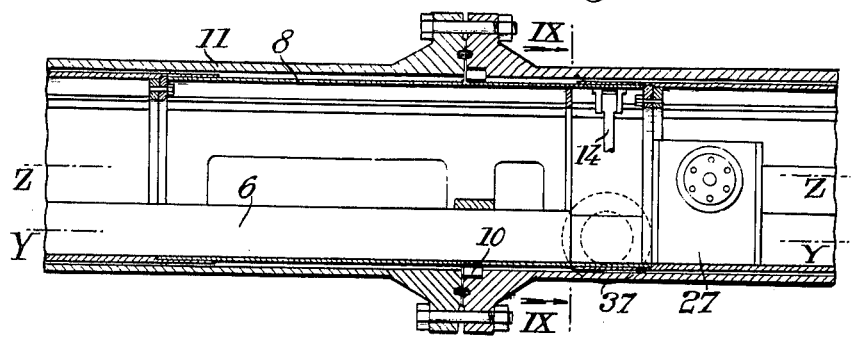
Figure 3C:
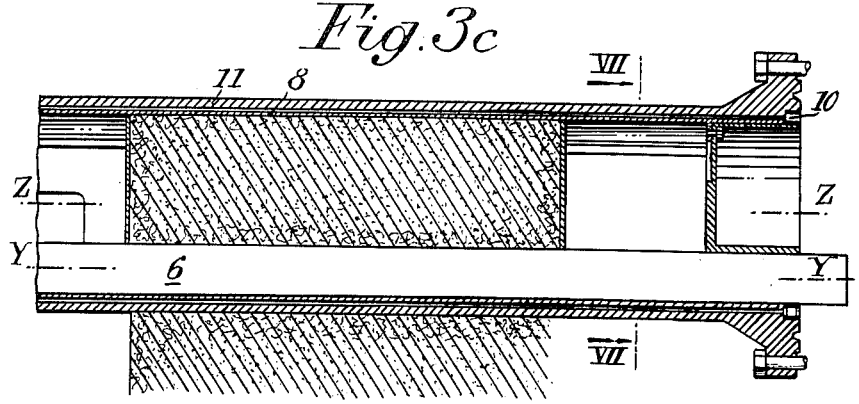

The axial control mechanism for the plug manipulator 4, generally designated 27 in FIG. 3b, is similar to the mechanism 23 just described but is positioned substantially in the mid-region of the shell 11, so as to allow for the relatively great length of the plugs to be manipulated, the requisite length of stroke of the manipulator arm being in this case comparatively short.

Each of the manipulator arms 4, 5 is provided at its outer end with a conventional manipulator grab, not shown, adapted to be actuated between its closed and open position by longitudinally displacing a wire or cable attached to the grab and extending through a bore in the related manipulator arm. The grab control arrangement will first be described in relation to the grab associated with the fuel manipulator arm 5. The part of the grab control cable extending from the end of it attached to the grab and passing through an axial bore formed through the manipulator arm 5 is shown at 28c (FIG. 2a) where it issues out of the inner end of guide 7. The said cable is reeved around a grooved pulley 32 which is mounted for rotation about a transverse axis supported from the rotary frame 8 within the frame. From the pulley 32 the cable then extends forwardly as the stretch 28b and is reeved around a pulley 30 rotatably mounted on a truck 31 which is longitudinally displaceable on ways in the frame 8. From pulley 30 the cable extends rearwardly as the stretch 28a and its free end is attached to a point of pulley 29 mounted for adjustable rotation on a transverse shaft journalled in the shell 11 (see FIG. 4) and extending into the interior of frame 8 by way of an aperture 9 therein. Pulley 29 can be rotated by way of a suitable control mechanism generally shown at 34. With the arrangement so far described and assuming truck 31 is held stationary on its ways, it will be evident that rotation of pulley 29 by means of control 34 will cause an axial displacement of the cable 28a–28b–28c relative to the manipulator arm 5, so as to open or close the associated grab as required.

Means are provided for longitudinally displacing the cable reeving truck 31 in order to follow any axial displacements of the manipulator arm 5 without such axial displacements causing relative movement of the cable 28a–28b–28c and consequent actuation of the grab. For this purpose truck 31 supports a further rotatable 33 (see FIG. 5) coaxial with pulley 30. An additional, follower, cable is trained around pulley 33 and has one end part 32a anchored to the tubular guide 7, while another stretch 32b of said cable extends forwardly from pulley 33, around a pulley mounted for rotation coaxially with gear 22 (see FIGS. 6 and 7), the free end of the cable being attached to a suitable anchor point not shown. With this arrangement it will be understood than when the manipulator 5 is longitudinally displaced in the guide 7 through action on mechanism 23 to rotate gear 22, the reeved truck 31 will be automatically displaced to follow the movement of the arm and cancel the relative displacements that would otherwise necessarily occur between the manipulator arm and cable 28a–28b–28c, so that unwanted actuation of the grab is prevented.

The movable reeving truck 31 is advantageously used simultaneously to maintain under tension any flexible elements such as an electric power cable 35 (FIG. 2a) which may be connected e.g. to a strain senser cooperating with the grab of arm 5, or other equipments. FIG. 2b further shows an emergency control 36 which can be manually operated to open the grab if required.

In the case of the plug manipulator arm 4, the associated grab may be provided with a simplified control mechanism since this grab need only be actuated as it reaches the normal position of the plug on the reactor. So long as the plug is positioned within the machine it may remain engaged by the grab, hence it is unnecessary in this case to provide for actuation of the grab in all positions of the manipulator arm 4. As shown in FIG. 9, a lever pivoted to a side of manipulator arm 4 is attached to a cable, not shown, the other end of which is connected to the grab for actuating it between its open and closed positions. This lever is adapted to be angularly displaced through any suitable rotatable coupling generally indicated at 38 from an actuating device 37 supported externally of shell 11, when frame 8 has been rotated to the active position of arm 4, the position shown in FIG. 9. The drive engagement from control mechanism 37 to coupling 38 is automatically established when frame 8 is rotated to this position and disconnected when the frame 8 is rotated away from this position.

The general operation of the machine described for inserting and removing fuel elements and plugs into and from a selected fuel channel will be obvious from the explanations previously given. The chief advantages of the machine as already earlier disclosed are its compacity, light weight and mechanical simplicity. The machine owes its compacity essentially to the fact that the fuel manipulator arm 5, which is necessarily very long in order to be able to reach all the way to the far end of a fuel channel, is displaceable only the small longitudinal distance that is required to extract the relatively short fuel elements or cartridges as far as the magazine 3, instead of having to be displaceable the much longer distance required for extraction of the long plug elements as was necessary in cases where the same manipulator arm was used for handling both the fuel elements and the plugs.

The lightness of the machine is moreover due to the fact that it requires less amount of shielding against radiations, since the greater part of its length receives the plugs, which are not very radioactive, so that the small end shield or cap 106 suffices for this. The much more active fuel elements received in the front part of the machine are efficiently protected by the heavy shielding provided at that point, as shown especially in FIG. 1 and 2c. In other words the shielding can be much reduced in weight since it is restricted to those parts of the machine where it is really useful. The mechanism is simple and effective and requires but little servicing.

It will be understood that many changes and modifications are possible without exceeding the scope of the invention. Thus the invention is applicable to vertical loading unloading machines instead of the horizontal type of machine shown. It is applicable to cases where the fuel channel of the core is open at only one end, or at both ends, so as to permit continuous unidirectional movement of the fuel elements through them.

What I claim is:

1. A loading-unloading machine for inserting and removing fuel elements and channel end-plugs into and from a fuel channel of a nuclear reactor, comprising a sealed shell, a sleeve at a forward end of the shell sealingly engageable with a fuel channel, in axial alignment therewith, a revolving magazine between said shell and said sleeve, a tubular frame supported in the shell, a first arm for manipulating said plugs, a second arm for manipulating said fuel elements, means supporting said arms longitudinally within said frame means for rotating said frame about an axis parallel to the axis of said sleeve between two active angular positions in each of which one of said arms is aligned with said sleeve and a fuel channel, and means for imparting axial displacements to each of said arms when the frame is positioned in the related active position.

2. The machine claimed in claim 1, wherein the angular distance of said arms circumferentially of the frame is not more than about 90°.

3. The machine claimed in claim 1, including tubular guides in said frame supporting the respective arms for axial sliding displacement therein.

4. The machine claimed in claim 1, having means for rotating the frame in the shell comprising a ram actuator having a casing mounted externally of the shell in sealed relation therewith and having a movable actuator element projectable through apertures in the shell and frame and link means having respective ends pivoted to said actuator element and to an inner surface of said frame for rotating the frame.

5. The machine claimed in claim 1, having means for axially displacing each of said arms comprising a rack carried by said arm and a gear mounted for rotation in the frame about a transverse axis and meshing with the rack, gear rotating means including a shaft projecting into the frame and rotatable from outside the shell, and joint means connecting said shaft with said gear to permit rotation of the gear from the shaft when the frame is positioned in a related one of its active positions without interfering with frame rotation between its active positions.

6. The machine claimed in claim 5, wherein said joint means comprises a Cardan joint arrangement having its centre located on the axis of frame rotation, and wherein the axis of the gear is aligned with the axis of said shaft in said related active position of the frame.

7. The machine claimed in claim 1, including grabs at the outer ends of said arms, cable means connected to the grabs and longitudinally displaceable relative to the arms for actuating the grabs between open and closed conditions, and means for displacing said cable means from outside the frame.

8. The machine claimed in claim 7, including means for reeving at least one of said cable means during axial displacement of the related arm relative to the frame so as to prevent relative displacement of the cable means during said arm displacement.

9. The machine claimed in claim 8, wherein the reeving means comprises a truck movable longitudinally in the frame, a pulley rotatable on the truck about a transverse axis and having said cable means trained therearound, and means connected to the truck and the arm for moving the truck on axial displacement of the arm.

10. The machine claimed in claim 1, including a grab supported at the outer end of said plug manipulator arm, cable means connected to the grab and longitudinally displaceable relative to the arm to actuate the grab between open and closed conditions, a lever pivoted to said arm and connected to the cable means, control means supported externally of the shell and including a rotatable shaft, and coupling means automatically engageable on rotation of the frame to a related active position for drivingly coupling said shaft with said lever.

11. A loading-unloading machine for inserting and removing fuel elements and channel end-plugs into and from a fuel channel of a nuclear reactor, comprising a sealed shell, a sleeve supported forwardly of said shell and having its rear end spaced from the forward end of said shell, said sleeve being sealingly engageable with a fuel channel in axial alignment therewith, a revolving magazine between said shell and said sleeve, a tubular frame supported in the shell, means for rotating said frame about an axis parallel to the axis of said sleeve between two active angular positions, a first arm for manipulating said plugs, a second arm for manipulating said fuel elements, means supporting said arms longitudinally within said frame parallel to said axis and at equal radial distances therefrom so as to be selectively alignable with the axis of said sleeve and fuel channel at a related one of two active angular positions of said frame in the shell, means for imparting axial displacements to each of said arms when the frame is in a related active position, and a revolving magazine mounted in the space between said ends of the shell and sleeve and rotatable about an axis parallel to said sleeve axis, said magazine having at least one axial passage therein alignable with said axes to provide communication for either of said manipulator arms between said frame and said fuel channel through said passage and sleeve.

References Cited by the Examiner

UNITED STATES PATENTS

| | | | |
|---|---|---|---|
| 2,981,422 | 4/1961 | Bellinger et al. | 176—30 X |
| 3,051,642 | 8/1962 | Dent | 176—30 X |
| 3,168,444 | 2/1965 | Ingram | 214—18 |

FOREIGN PATENTS 941,600　11/1963　Great Britain.

OTHER REFERENCES

Weber, German Application No. 1,066,669, printed October 8, 1959 (KL 21 g 21/20).

LEON D. ROSDOL, *Primary Examiner.*

L. DEWAYNE RUTLEDGE, REUBEN EPSTEIN,
*Examiners.*